(12) United States Patent
Takagi et al.

(10) Patent No.: US 7,164,455 B2
(45) Date of Patent: Jan. 16, 2007

(54) DEVICE, MANUFACTURING METHOD THEREOF, AND ELECTRONIC INSTRUMENT WITH THE DEVICE

(75) Inventors: Kenichi Takagi, Kusashiki (JP); Tomohiko Sogo, Shiojiri (JP); Yuji Saito, Suwa (JP)

(73) Assignee: Seiko Epson Corporation (JP)

( * ) Notice: Subject to any disclaimer, the term of this patent is extended or adjusted under 35 U.S.C. 154(b) by 105 days.

(21) Appl. No.: 10/692,073

(22) Filed: Oct. 23, 2003

(65) Prior Publication Data

US 2004/0174469 A1    Sep. 9, 2004

(30) Foreign Application Priority Data

Oct. 25, 2002    (JP)    ............... 2002-311051

(51) Int. Cl.
*B05D 3/06*    (2006.01)
*B32B 27/00*    (2006.01)
*G02F 1/1333*    (2006.01)
*G02F 1/1335*    (2006.01)

(52) U.S. Cl. ............ 349/114; 349/106; 349/122; 428/411.1; 427/535; 427/536; 427/558

(58) Field of Classification Search ............ 428/411.1; 427/535, 536, 558; 349/106, 114, 122, 139
See application file for complete search history.

(56) References Cited

U.S. PATENT DOCUMENTS 4,857,386 A * 8/1989 Butters et al. ............... 428/206

6,274,516 B1 * 8/2001 Kamei et al. ............... 438/782

FOREIGN PATENT DOCUMENTS

| JP | 63-221321 | 9/1988 |
|---|---|---|
| JP | 63-247726 | 10/1988 |
| JP | 01-211724 | 8/1989 |
| JP | 04-090511 | 3/1992 |
| JP | 06-018889 | 1/1994 |
| JP | 06-018898 | 1/1994 |
| JP | 06-281939 | 10/1994 |
| JP | 06-289396 | 10/1994 |
| JP | 06-336530 | 12/1994 |
| JP | 08-188658 | 7/1996 |
| JP | 10-123500 | 5/1998 |
| JP | 2001-105538 | 4/2001 |
| JP | 2003-273111 | 9/2003 |
| JP | 2004-031558 | 1/2004 |

* cited by examiner

*Primary Examiner*—Ramsey Zacharia
(74) *Attorney, Agent, or Firm*—Harness, Dickey & Pierce, P.L.C.

(57) ABSTRACT

A device has a substrate in which base components are formed on base plates and functional films are formed on the base components. On the base components, lyophilic films having a lyophilic property to liquid forming material for forming the functional films are provided, and on these lyophilic films, functional films are provided.

10 Claims, 10 Drawing Sheets

DEVICE, MANUFACTURING METHOD THEREOF, AND ELECTRONIC INSTRUMENT WITH THE DEVICE

BACKGROUND OF THE INVENTION

1. Field of the Invention

The present invention relates to a device in which a base component is formed on a base plate and a functional film is additionally formed on the base component, a manufacturing method thereof, and an electronic instrument.

2. Related Art

Recently, a display device such as a liquid crystal display device has been extensively used for an electronic instrument such as a cellular phone and a portable personal computer.

Conventionally, as a color filter substrate used for such display device, a substrate having a structure shown in FIG. 11, for example, has been known. In FIG. 11, the sign "201" denotes a base plate, and on this base plate 201, respective color pixels 202R, 202G, and 202B of R (red), G (green), and B (blue), which constitute a color filter, are formed in a predetermined arrangement such as a striped arrangement, a mosaic arrangement, and a delta arrangement, and an over-coating film 203 is additionally formed thereon.

Here, the formation of the overcoating film 203 (over coating layer) on the color pixels 202R, 202G, 202B is to allow the overcoating film 203 to perform the following functions.

The first function is to prevent disconnection of electrodes formed on a surface of the color filter substrate by planarizing the surface of the color filter substrate with the formation of the overcoating film 203.

The second function is to enable the lamellation and low resistance of the electrodes by preventing disconnection, thereby improving contrast ratios between pixels.

The third function is to prevent the pixels (color pixels 202R, 202G, 202B) within the color filter substrate from being damaged and to protect them in process steps subsequently performed after forming the overcoating film 203.

The fourth function is, in the case where the color filter substrate is used for a liquid crystal display device, to prevent impurities from diffusing from the color filter substrate to the liquid crystal after the liquid crystal is enclosed in the cell gap.

Conventionally, after forming the plural color pixels 202R, 202G, 202B of R (red), G (green), B (blue), or C (cyan), M (magenta), Y (yellow), etc. on a predetermined area partitioned by a black matrix 204 on the base plate 201, the overcoating film 203 having above mentioned functions has been formed thereon, i.e., on an entire surface of the black matrix 204 and the color pixels 202R, 202G, 202B, by coating liquid transparent resin such as resist in uniform thickness by the spin coating technique etc.

Further, as a forming method of the color pixels 202R, 202G, 202B, which precedes the step of forming the overcoating layer 203, a method for patterning color pixel materials in the form of films of respective colors by using the photolithography technique has been adopted.

However, in the case where the patterning is performed by using the photolithography technique to form respective color pixels, since the steps are complicated and the respective color pixel materials, photo resist, etc. are used in large quantities, the problem of increased costs occurs.

Therefore, in order to solve this problem, a method for discharging filter material (color pixel material) etc. in the form of dots by the droplet discharging technique (ink jet technique) to arrange and form a component such as color pixels in a dotted form is proposed.

More specifically, as shown in FIG. 12(a), at first, bank-shaped partition members 6 having a predetermined height are formed on a base plate 2. These partition members 6 are formed from resin material etc. having liquid repellency to liquid filter materials 5 (see FIG. 12(b)) discharged by the droplet discharging technique. Alternately, after forming the member, a liquid-repellent film is formed on a surface thereof for performing liquid repellency. Then, since the partition members 6 have liquid repellency to the filter materials 5, the filter materials 5 adjacent to each other are prevented from being mixed because the partition members 6 are interposed between them, and each of them will independently form a color pixel as shown in FIG. 12(b).

As described above, a color filter constituted by the color pixels 3 (3R, 3G, 3B) can be formed by the droplet discharging technique, as shown in FIG. 12(c). In addition, a color filter substrate can be fabricated by forming an overcoating film 4 on the color pixel 3 (3R, 3G, 3B), as described above and shown in FIG. 12(d).

However, by the method as shown in FIG. 12, since the partition members 6 have liquid repellency, they also perform liquid repellency to the liquid material of the overcoating film 4 coated thereon, as a result, coating irregularities of the liquid material occur on the surface of the partition members 6. Then, since irregularities in film thickness occurs in the overcoating film 4, the above-described four functions of the overcoating film can not sufficiently be performed, and therefore, in a device such as a liquid crystal display device, an inconvenience such as degradation of display quality will occur.

In addition, other than the overcoating film (over coating layer), with respect to a film and a layer provided on various base components formed on a base plate such as a planarizing film, an interlayer insulative film, and an alignment film used in a liquid crystal display device, it is also desirable that the film (layer) is planarized and uniform for the purpose of performing its required functions without being affected by irregularities due to base components.

The present invention is achieved in light of the above, and an object thereof is to planarize a functional film formed on a base component and uniform its thickness, thereby providing a device in which a function of the functional film is intended to be improved, a manufacturing method thereof, and an electronic instrument.

SUMMARY

In order to achieve the object, a device of the present invention is a device in which a functional film is formed on a base component of a substrate in which the base component is formed on a base plate, and the device is characterized in that a lyophilic film having a lyophilic property to liquid forming material for forming the functional film is provided on the base component, and the functional film is provided on the lyophilic film.

Since the device is constituted by providing the lyophilic film on the base component, and on this lyophilic film, the functional film is provided, when the liquid forming material for forming the functional film is coated on the lyophilic film, the liquid forming material preferably spreads on this lyophilic film because the material has good wettability to the lyophilic film, thereby the functional film is planarized and made uniform in film thickness by uniformly spreading the material. Therefore, according to the device, since the functional film is formed so as to be planarized and uniformly thick, functional characteristics of the functional film will be preferable.

Further, in the above-described device, it is preferred that the lyophilic film is formed by performing plasma treatment on the lyophilic film forming material under atmospheric pressure or a reduced pressure.

By doing this, the lyophilic film has a more preferable lyophilic property to the liquid forming material for forming the functional film, and thus, planarization and uniformity of the film thickness of the functional film become remarkable, thereby the functional characteristics of the functional film will be further improved.

Furthermore, in the above-described device, it is preferred that the lyophilic film is formed by irradiating lyophilic film forming material with an electromagnetic wave under atmospheric pressure or a reduced pressure. Note that in this case, it is preferable that the electromagnetic wave is an ultraviolet ray.

By doing this, an electromagnetic wave irradiation device for forming the lyophilic film can be used which is more simple and less expensive than a plasma device etc., and therefore, the manufacturing cost can be reduced. In the case where an ultraviolet ray is used as the electromagnetic wave, the manufacturing cost will be further reduced since the irradiation device is even less expensive.

A manufacturing method of a device of the present invention is a manufacturing method of a device for forming a functional film on a base component of a substrate in which the base component is formed on a base plate, and the method is characterized by forming a lyophilic film having a lyophilic property to a liquid forming material for forming the functional film on the base component, and providing the functional film on the lyophilic film.

According to the manufacturing method of a device, since a lyophilic film is formed on a base component, and on this lyophilic film, the functional film is provided, when coating the liquid forming material for forming the functional film on the lyophilic film, the liquid forming material can preferably be spread on the lyophilic film because the liquid forming material has good wettability to the lyophilic film, thereby the functional film can be planarized and made uniform in film thickness by uniformly spreading the material. Therefore, since the functional film can be formed so as to be planarized and uniformly thick, the functional characteristics of the functional film will be preferable, thereby the percentage of non-defective products can be improved and the time for forming the film can be shortened.

Further, in the above-described manufacturing method, it is preferred to form the lyophilic film by performing plasma treatment on the lyophilic film forming material under atmospheric pressure or a reduced pressure.

By doing this, the lyophilic film has a more preferable lyophilic property to the liquid forming material for forming the functional film and a planarization and uniformity of the film thickness of the functional film become remarkable, thereby the functional characteristics of the functional film will be further improved.

Furthermore, in the above-described manufacturing method, it is preferred to form the lyophilic film by irradiating the lyophilic film forming material with an electromagnetic wave under atmospheric pressure or a reduced pressure. Note that in this case, it is preferable that the electromagnetic wave is an ultraviolet ray.

By doing this, the electromagnetic wave irradiation device for forming the lyophilic film is more simple and less expensive than a plasma device etc., and therefore, the manufacturing cost can be reduced. In the case where an ultraviolet ray is used as the electromagnetic wave, the manufacturing cost can be further reduced since the irradiation device is even less expensive.

An electronic instrument of the present invention is characterized by comprising the above-described device.

According to the electronic instrument, since the instrument comprises the device in which the function characteristics of the functional film are preferable, various functions such as display characteristics will be preferable.

BRIEF DESCRIPTION OF THE DRAWINGS

FIG. 4(a) is a side sectional view; and FIG. 4(b) is a sectional view seen from an arrow along A—A line in (a).

FIG. 6(a) is a plan view of the display; and FIG. 6(b) is a sectional view seen from an arrow along A–B line in (a).

DETAILED DESCRIPTION

Hereinafter, the invention will be described in detail.

In this embodiment, a device of the present invention will be described with a liquid crystal display device as a display device with an overcoating film that covers a color filter and an alignment film as an example.

Figure 1:
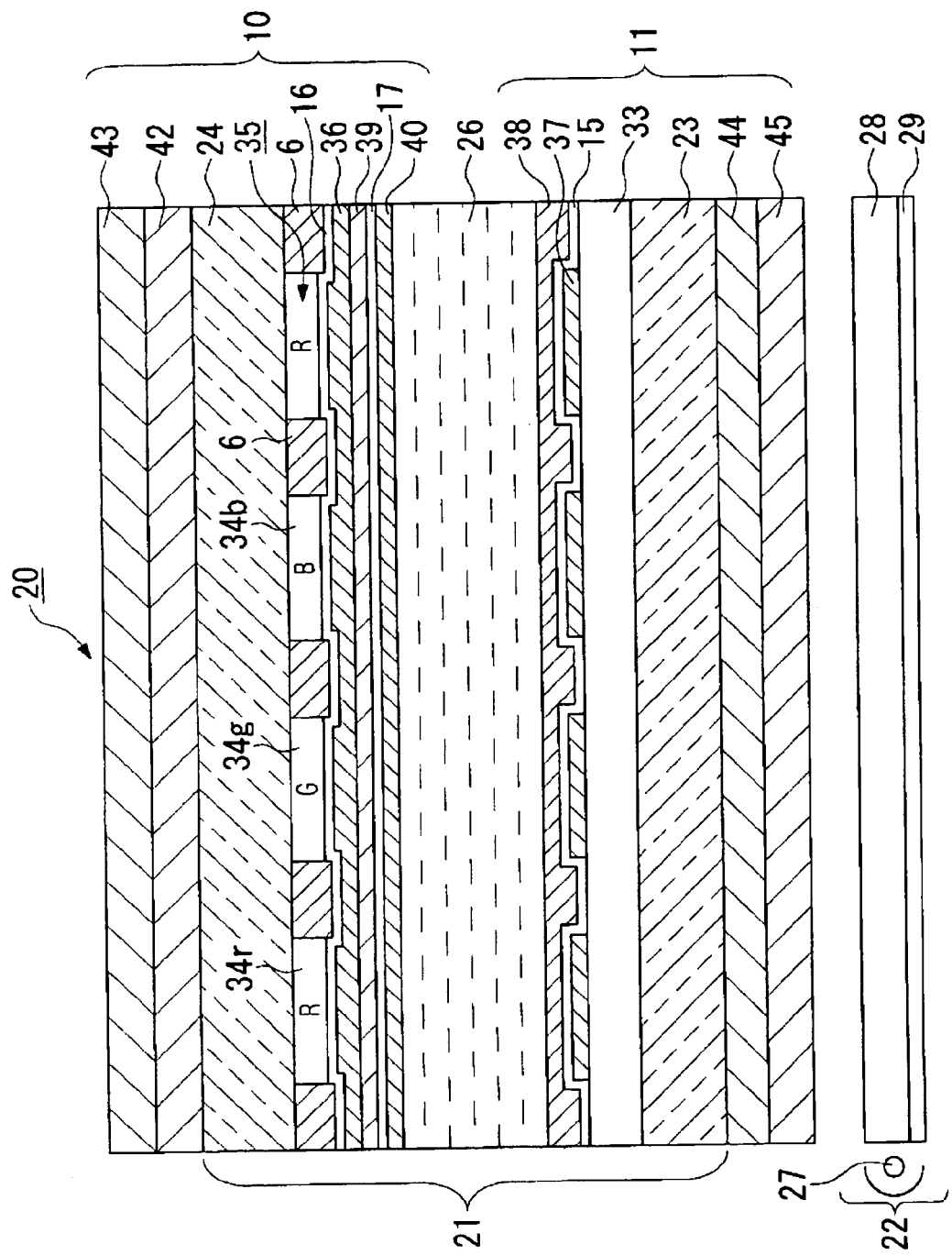
FIG. 1 is a side sectional view illustrating an example in the case where a device of the present invention is applied to a liquid crystal display device.

FIG. 1 shows a liquid crystal display device as a display device, and the sign "20" denotes a transflective color liquid crystal display device in the drawing. Note that in the following drawings, the film thicknesses of respective components and dimensions thereof differ for ease of viewing.

The liquid crystal display device 20 has a liquid crystal cell 21 and a backlight 22 (lighting device). In the liquid crystal cell 21, a lower base plate 23 and an upper base plate 24 are oppositely disposed, and a liquid crystal layer 26, formed of nematic liquid crystal etc. having a phase difference set to $\lambda/2$, for example, sandwiched between these upper base plate 24 and the lower base plate 23. The backlight 22 is disposed on the rear surface side of the liquid crystal cell 21 (on the outer surface side of the lower base plate 23), and the backlight 22 is constituted by having a light source 27 of an LED (light emitting diode) etc., a light guiding plate 28, and a reflecting plate 29, etc.

A transflective layer 33 is formed on an inner surface side of the lower base plate 23 made of transparent material such as glass. The lower base plate 23 is constituted by a transparent plate such as glass, and the transflective layer 33 reflects a part of circularly polarized light having a predetermined rotational direction, and transmits another part thereof.

Lower electrodes 37 of transparent conductive films such as ITO are formed in a striped manner on an upper side of the transflective layer 33 on the inner surface side of the lower base plate 23, and an alignment film 38 (an alignment film for orienting liquid crystal molecules in the liquid crystal layer 26) made of resin such as polyimide is formed thereon via a lyophilic film 15. The lyophilic film 15 is provided so that the alignment film 38 serving as a functional film may be planarized and made uniform against the lower electrodes 37 as a base component, and the lyophilic film 15 is formed by material having a lyophilic property with respect to a liquid forming material for forming the alignment film 38, for example, a hydrocarbon polymerized film such as a polyethylene film.

On the other hand, on an inner surface side of the upper base plate 24, color pixels 34r, 34g, and 34b including pigments of different colors of R, G and B, for example, are provided within areas partitioned by partition members 6, and a color filter layer 35 is thereby formed. Note that the partition members 6 are formed by resin material etc. having liquid repellency to the forming material of the color filter layer 35, as described above, or, after forming the members, a liquid-repellent film is formed on the surface thereof for performing liquid repellency.

An overcoating film (overcoating layer) 36 is formed on these partition members 6 and the color filter layer 35 (color pixels 34r, 34g, and 34b) via a lyophilic film 16. The lyophilic film 16 is formed for the same purpose as that of the lyophilic film 15 so that the overcoating film 36 serving as a functional film may be planarized and made uniform against the partition members 6 and the color filter layer 35, which are base components. Note that this lyophilic film 16 is also formed by lyophilic material, for example, a hydrocarbon polymerized film such as a polyethylene film, having a lyophilic property to liquid forming material for forming the overcoating film 36.

Further, on an inner surface side of the overcoating film 36, upper electrodes 39 made of a transparent conductive film such as ITO are formed in a striped manner and an alignment film 40 made of resin such as polyimide (alignment film for orienting liquid crystal molecules of the liquid crystal layer 26) is formed thereon via a lyophilic film 17. The lyophilic film 17 is provided, with the same purpose of the lyophilic film 15, so that the alignment film 40 serving as a functional film may be planarized and made uniform against the upper electrodes 39 as a base component, and formed of a hydrocarbon polymerized film such as a polyethylene film.

Note that, for the electrode structure formed by the lower electrodes 37 and the upper electrodes 39, one of an active matrix type and a passive matrix type using a switching element such as a thin-film transistor (TFT) and a thin film diode (TFD) is adopted.

On an outer surface side of the upper base plate 24, an upper wave plate 42 and an upper polarization plate 43 (both constitute upper base plate side circular polarized light entering means) are provided sequentially from the base plate side. On the other hand, on an outer surface side of the lower base plate 23, a lower quarter wave plate (lower wave plate) 44 and a lower polarization plate 45 (both constitute lower base plate side circular polarized light entering means) are provided sequentially from the base plate side. These wave plates 42, 44 and polarization plates 43, 45 are for allowing the circular polarized light having a predetermined rotational direction relative to the liquid crystal layer 26 to enter. Note that, in the case where it is especially desirable to add a function of color compensation to the wave plate provided on the upper base plate 24 side, the quarter wave plate is not necessarily used and a wave plate having any phase difference may be selected.

Next, as a manufacturing method of the liquid crystal display device 20 having the structure described above, the formation of the lyophilic film 15 (16, 17) and the functional film (overcoating film 36, alignment films 38, 40) disposed thereon will be specifically described.

Figure 2:
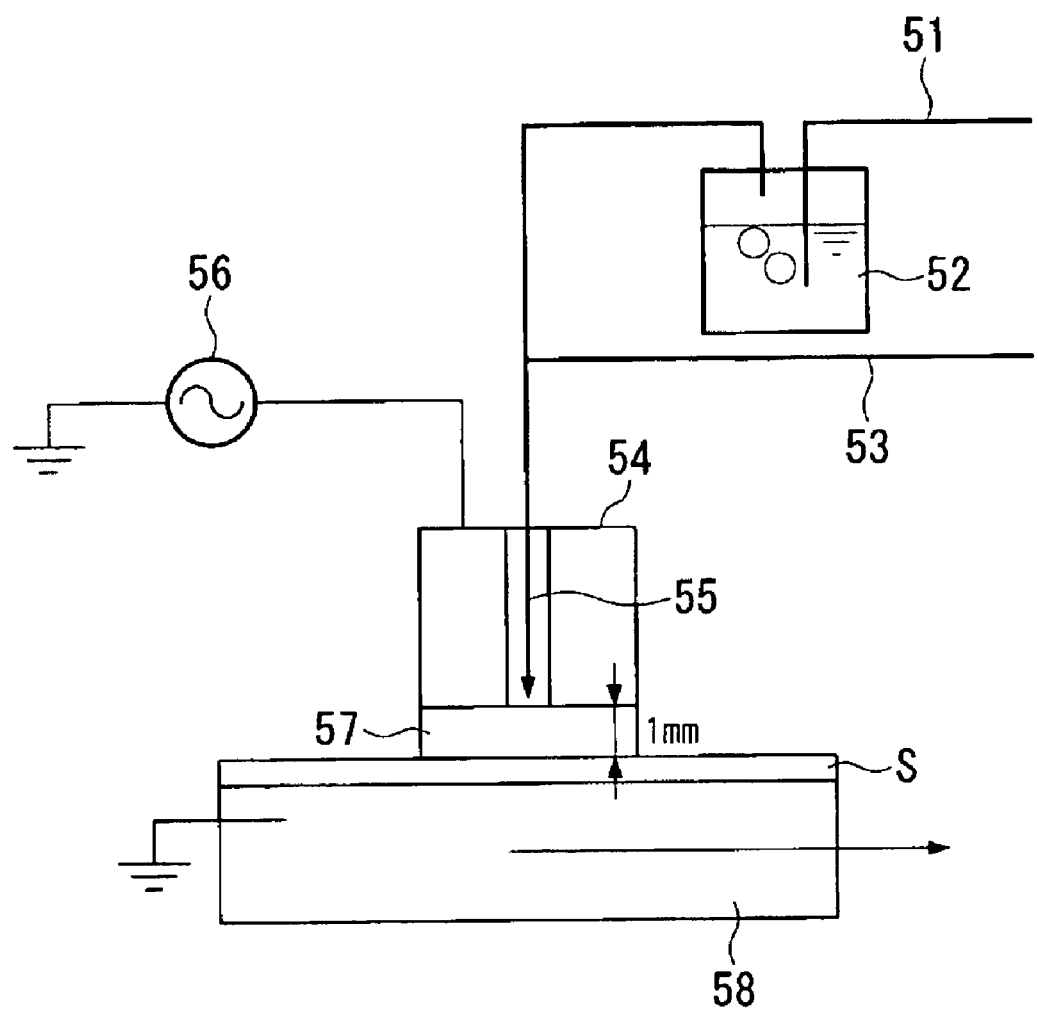
FIG. 2 is a schematic view illustrating an example of a lyophilic film forming device.

FIG. 2 is a schematic view illustrating an example of a lyophilic film forming device, and this lyophilic film forming device is for forming a lyophilic film on the surface of a substrate "S" by turning helium (He) gas including n-decane into plasma under atmospheric pressure (or a reduced pressure) and irradiating the substrate "S" with the plasma. Here, the base plate 23 (24) on which base components such as a color filter layer 35 and electrodes (lower electrodes 37, upper electrodes 39) are formed is referred to as the substrate "S."

In this lyophilic film forming device, helium gas 51 is introduced at a flow rate of 100 sccm into n-decane solution stored in a container 52, and bubbled (vaporized). The helium gas including n-decane by being bubbled is fed from the container 52 to a first electrode 54. By the way, the helium gas 53 is supplied at a flow rate of 10 slm to the first electrode 54.

Further, a high-frequency voltage having a frequency of 13.56 MHz is applied from a high-frequency power supply 56 to the first electrode 54. Here, the power supplied from the high-frequency power supply 56 to the first electrode 54 is set to 400 W, for example. A stage 58 serving as a second electrode is disposed in a position opposite to the first electrode 54.

The stage 58 is for mounting and fixing the substrate "S" as a treated object thereon, and is movable in the horizontal direction while keeping a predetermined distance relative to a lower end of the first electrode 54. The distance (gap) between the first electrode 54 and the substrate "S" mounted on the stage (second electrode) 58 is set to 1 mm, for example. The movement speed of the stage 58, i.e., the conveyance speed of the substrate "S" is set to 0.46 mm/sec, for example.

Under the above-described structure, the n-decane vapor within the helium gas 55, which has been introduced into the first electrode 54, is excited in a highly activated state in the plasma 57 generated between the electrode 54 to which the high-frequency voltage is applied and the stage (second electrode) 58, and additionally polymerized. Then a hydrocarbon polymerized film such as polyethylene is formed by the polymerization to cover the base components on an upper surface of the substrate "S," and becomes a lyophilic film 15 (16, 17). Note that, since the substrate "S" is moved together with the stage 58 in the horizontal direction, the lyophilic film 15 (16, 17) is formed on the entire surface of the substrate "S."

Here, with respect to a film thickness of such lyophilic film 15 (16, 17), since the function thereof is enough only to perform a lyophilic property, the film thickness is not necessarily made especially thick and may be formed in a thin thickness on the order between 1 nm to 100 nm.

After the formation of the lyophilic film 15 (16, 17) as described above, a functional film, i.e., the overcoating film 36 or the alignment film 38 (40) is formed on the lyophilic film 15 (16, 17). The overcoating film 36 is formed by using liquid material in which resin selected from acrylic resin, epoxy resin, imidic resin, fluoric resin, etc. is dissolved in a solvent such as glycolic solvent or dispersed in a dispersion medium, as a forming material thereof, and the overcoating film is formed by coating these with the spin coating technique, the droplet discharging technique, and the cap coat technique, etc., and subsequently performing drying and baking. The alignment film 38 (40) is formed by using liquid material in which polyimidic resin, for example, is dissolved in a solvent or dispersed in a dispersion medium, as a forming material thereof, and the alignment film is formed by coating these with the spin coating technique, the droplet discharging technique, and the cap coat technique, etc., and subsequently by performing drying and baking.

In the case where the lyophilic film 15 (16, 17) is formed on the base components and the overcoating film 36 and the alignment film 38 (40) are additionally formed as functional films thereon, as described above, when the forming material of the functional films are coated on the lyophilic film 15 (16, 17), since the forming material has good wettability to the lyophilic film 15 (16, 17), the forming material preferably spreads on the lyophilic film 15 (16, 17), thereby the forming material becomes sufficiently and preferably planarized while being hardly affected by irregularities of the base components. Further, since the forming material has good wettability and preferably spreads, when the base surface is at the same level, the functional film will be formed with a common thickness, i.e., having a uniform thickness.

Therefore, since the overcoating film 36 is provided on the partition members 6 and the color filter layer 35 via the lyophilic film 16, the overcoating film 36 is sufficiently planarized without being affected by the irregularities of the partition members 6 and the color filter layer 35 serving as a base component, and without being affected by the liquid repellency of the partition members 6, even in the case where the partition members 6 perform the liquid repellency, because the lyophilic film 16 covers over the partition members, thereby the overcoating film 36 will preferably perform the four functions as an overcoating film, one of which is to prevent disconnection of the upper electrodes 39 formed thereon.

Furthermore, since the alignment film 38 (40) is provided on the electrodes 37 (39) arranged in a striped manner via the lyophilic film 15 (17), the alignment film 38 (40) is sufficiently planarized, without being affected by the irregularities due to the existence/non-existence of the electrodes 37 (39), serving as a base component, and by the difference in materials, thereby the rubbing treatment of the alignment film 38 becomes easy and the treatment becomes uniform, and the characteristics of the liquid crystal are also uniform, as a result, display characteristics can be improved.

Thus, since the overcoating film 36 and the alignment film 38 (40) as functional films are formed via the lyophilic film 15 (16, 17), the functional characteristics of the overcoating film 36 and the alignment film 38 (40) can be preferable in the liquid crystal display device 20, thereby the percentage of non-defective products can be improved and the time for forming films can be shortened.

Figure 3:
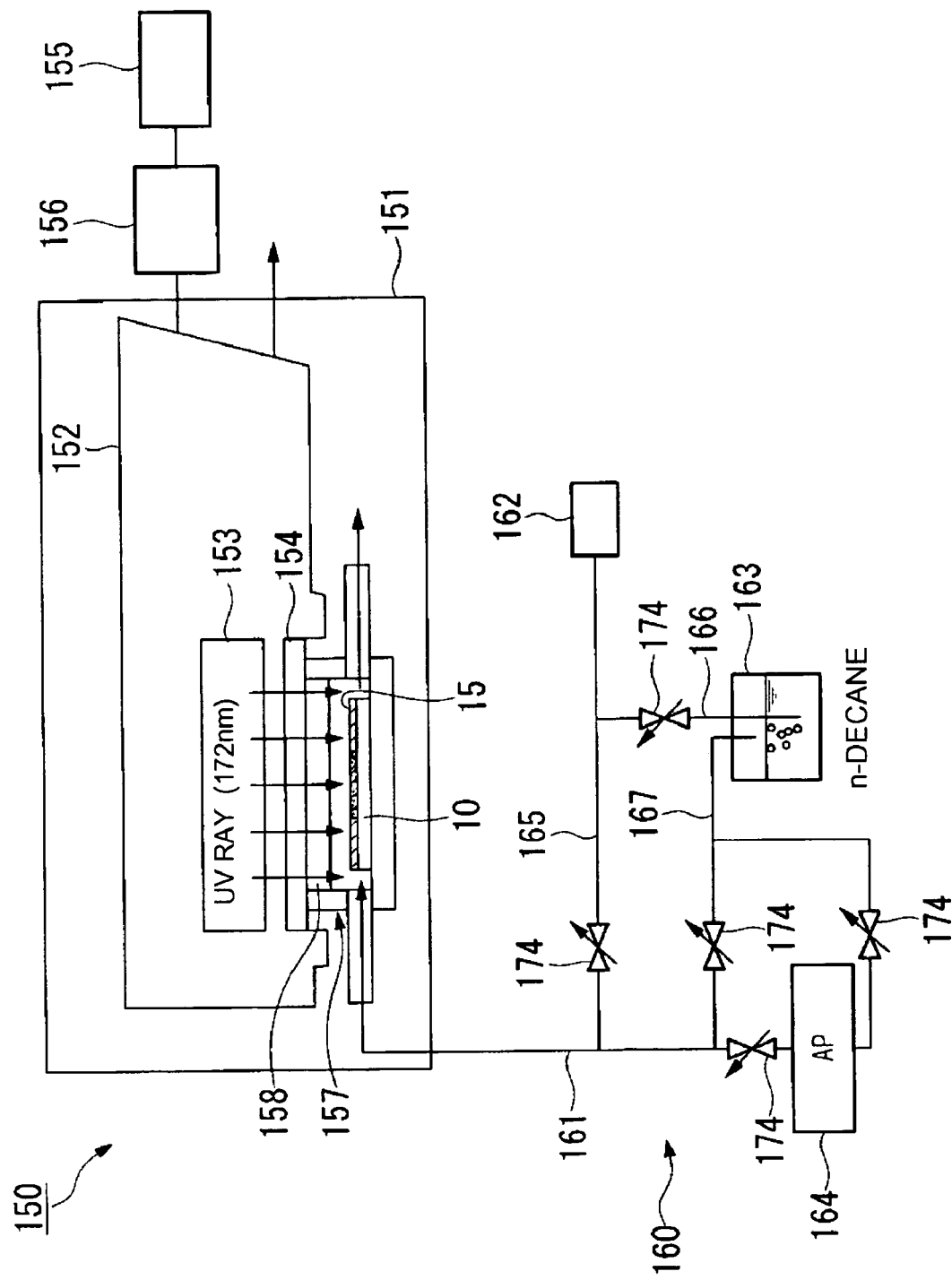
FIG. 3 is a schematic view illustrating an example of an ultraviolet irradiation device as an electromagnetic wave treatment device.

The lyophilic film forming device shown in FIG. 2 is used for forming the lyophilic film 15 (16, 17) in the above example, however, the invention is not limited to the example and various film forming devices, such as an electromagnetic wave irradiation device can be used for forming the lyophilic film. FIG. 3 shows an ultraviolet irradiation device as the electromagnetic wave treatment device, the sign "150" denotes an ultraviolet irradiation device in FIG. 3.

This ultraviolet irradiation device 150 includes a local exhaust hood 151, a lamp house 152 disposed on an upper side within the local exhaust hood 151, a UV light source 153 disposed inside of the lamp house 152, and a synthetic quartz (silica glass) 154 disposed on the bottom surface of the lamp house 152. Here, as the UV light source 153, a xenon (Xe) lamp that irradiates an ultraviolet ray having wavelength of 172 nm is preferably used. By the way, the lamp house 152 is adapted so that nitrogen may be supplied into the lamp house 152 from a nitrogen source 155 via a flowmeter 156, and scrubber exhaust may be performed from inside of the lamp house 152.

Further, inside of the local exhaust hood 151, a holder 157 is disposed on a lower side of the synthetic quartz 154. The holder 157 is formed in a box shape and is adapted so that the synthetic quartz (silica glass) 158 may be detachably mounted to its upper opening. Under the above structure, the holder 157 is adapted so that the substrate "S" may be removably accommodated therein, and an upper opening may be sealed with the substrate "S" so accommodated.

Furthermore, an atmosphere generating device 160 is connected to the ultraviolet irradiation device 150. This atmosphere generating device 160 is connected to the holder 157 of the ultraviolet irradiation device 150 via a main pipe 161, and for supplying atmosphere forming gas into the holder 157. The atmosphere generating device 160 includes a nitrogen supply source 162 comprising a gas cylinder etc., a container 163 containing lyophilic film forming material, and an atmospheric pressure plasma device 164. The nitrogen supply source 162 is connected to the main pipe 161 via a pipe 165 and also connected to the container 163 via a branch pipe 166.

The container 163 is a closed container storing, for example, n-decane as lyophilic film forming material, and the branch pipe 166 is disposed therein and extends below the liquid level of the n-decane. With the above structure, the nitrogen supplied by the branch pipe 166 is used for bubbling within the liquid of n-decane. By the way, as the lyophilic film forming material, in addition to straight chain saturated hydrocarbon such as n-decane, various materials such as ethers, alcohols, ketones, amines, and organic compounds having nitro group can be used. Further, a pipe 167 is connected to the container 163, and this pipe 167 branches so that one may be connected to the atmospheric pressure plasma device 164 and the other may be connected to the main pipe 161.

Figure 4:
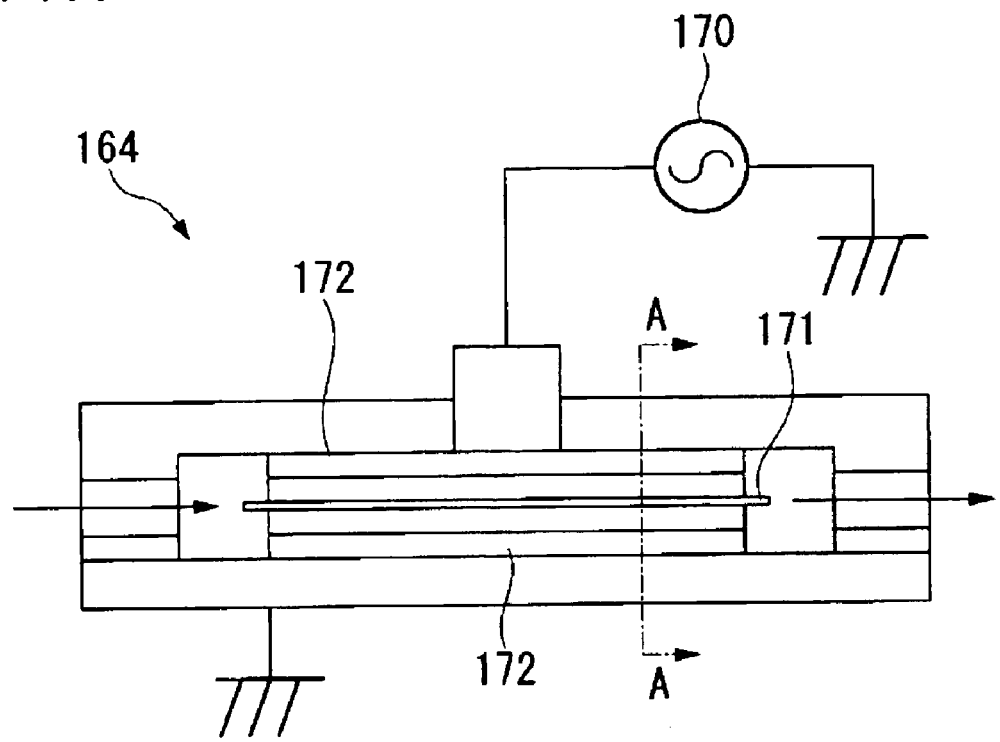
FIG. 4 are views illustrating a schematic structure of an atmospheric pressure plasma device.
Figure 4:
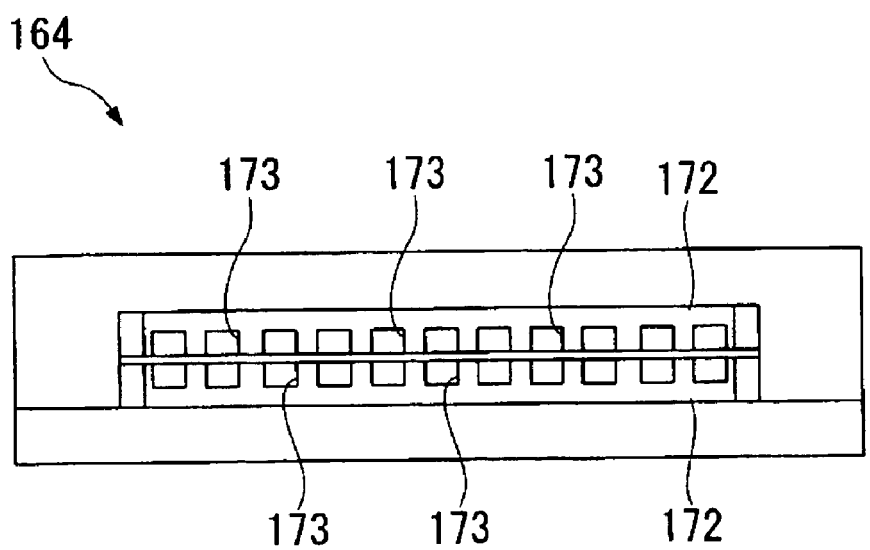

The atmospheric pressure plasma device 164 includes a high-frequency power supply 170 and a pair of high-frequency electrodes 172, 172 with an insulative body 171 therebetween, as shown in FIG. 4(a), and includes a number of reaction chambers 173, partitioned along a direction of flow of the gas (lyophilic film forming material) supplied from the container 163, between the high-frequency electrodes 172, 172, as shown in FIG. 4(b). With the above structure, the atmospheric pressure plasma device 164 is adapted for generating plasma between the high-frequency electrodes 172, 172, i.e., in the reaction chambers 172 thereby exciting the gas (lyophilic film forming material) passing within the reaction chambers 173 into a highly activated state.

Furthermore, the atmospheric pressure plasma device 164 has a gas exit side connected to the main pipe 161. By the way, the main pipe 161, the pipe 165, the branch pipe 166, and the pipe 167 are provided with flow rate adjusting valves 174, respectively, for adjusting the flow rate of the gas flowing in the respective pipe.

To form the lyophilic film 15 (16, 17) on the base components of the substrate "S" by such atmospheric pressure plasma device 164, first, the atmosphere within the holder 157, in which the substrate "S" is placed, is changed into lyophilic film forming atmosphere by the atmosphere generating device 160.

To create the lyophilic film forming atmosphere by the atmosphere generating device 160, the respective flow rate adjusting valves of the atmosphere generating device 160 are adjusted so that the nitrogen from the nitrogen supply source 162 may bubble (vaporize) the lyophilic film forming material (n-decane) within the container 163, and the nitrogen including the vapor of the lyophilic film forming material is introduced into the atmospheric pressure plasma device 164, at a flow rate of 50 sccm, for example. Then, the lyophilic film forming material in the nitrogen is excited into the highly activated state within the atmospheric pressure plasma device 164 and the nitrogen including the vapor of the lyophilic film forming material in this state is introduced into the holder 157. Here, as the condition in which plasma is generated by the atmospheric pressure plasma device 164, the generation is performed with the discharged power by the high-frequency power supply 170 set to 50 W and the frequency set to 23 k Hz for example.

As described above, after turning the atmosphere within the holder 157 into the lyophilic film forming atmosphere, i.e., the atmosphere in which the lyophilic film forming material is excited in the highly activated state, an ultraviolet ray is irradiated from the UV light source 153. Then, by the ultraviolet ray passing through the lyophilic film forming atmosphere, the lyophilic film forming material excited to the highly activated state within the atmosphere is polymerized by receiving additional energy and becomes polyethylene, for example, to form the lyophilic film 15 (16, 17) on the substrate "S." Such formation of the lyophilic film 15 (16, 17) is performed in a predetermined period, and when the lyophilic film 15 (16, 17) having a necessary thickness is formed, the introduction of the nitrogen including the vapor of the lyophilic film forming material is stopped and also the irradiation of ultraviolet ray is stopped.

In the case where the lyophilic film 15 (16, 17) is formed by the ultraviolet irradiation device 150 as described above, since the ultraviolet irradiation device 150 is simple and less expensive relative to the plasma device etc., the manufacturing cost can be reduced with reduction of the device cost. Specifically, in the case where a large-scale substrate such as a mother board is treated, the plasma device is difficult to enlarge because the device cost is high, and thus, addressing the large-scale substrate is difficult, however, the electromagnetic wave irradiation device, especially the ultraviolet irradiation device 150 is easy to enlarge because of its simple structure, etc., and thus, addressing the large-scale substrate becomes easy and productivity can be improved.

Note that, in the above example, the ultraviolet irradiation device 150 is used as the electromagnetic wave irradiation device, the invention is not limited to the device, and various devices can be used. For example, a laser device that has a laser light source for irradiation of a laser beam, or an electron beam device for irradiation of an electron beam can be used as the electromagnetic wave irradiation device.

In the case where the laser device or the electron beam device is used, various lyophilic films can be formed by adjusting the irradiation energy of the laser beam and the electron beam to make the lyophilic film forming material correspond to the type and status thereof.

Further, the atmosphere generating device 160 includes the atmospheric pressure plasma device 164 for exciting the vapor of the lyophilic film forming material in the highly activated state, however, the atmospheric pressure plasma device 164 is not necessarily provided in the invention. As a matter of course, a low-pressure plasma device can be used and any other devices, which could excite the vapor of the lyophilic film forming material in the highly activated state, can be used.

Furthermore, in the above example, a liquid crystal display device is cited as a device of the invention to form the overcoating film and the alignment film as a functional film, however, the invention is not limited to the device and can be suitably applied to various devices such as an organic EL device, an electrophoretic device, a plasma display device, and further a device comprising various optical elements and semiconductor elements having a resistor, a capacitor, a transistor, a diode, a semiconductor laser, when forming functional films in the devices. Also, it is needless to say that the present invention can be used when forming a metal wiring by discharging a wiring material (liquid material containing metal fine particles) by the ink jet technique in predetermined positions on the semiconductor substrate, for example.

Figure 5:
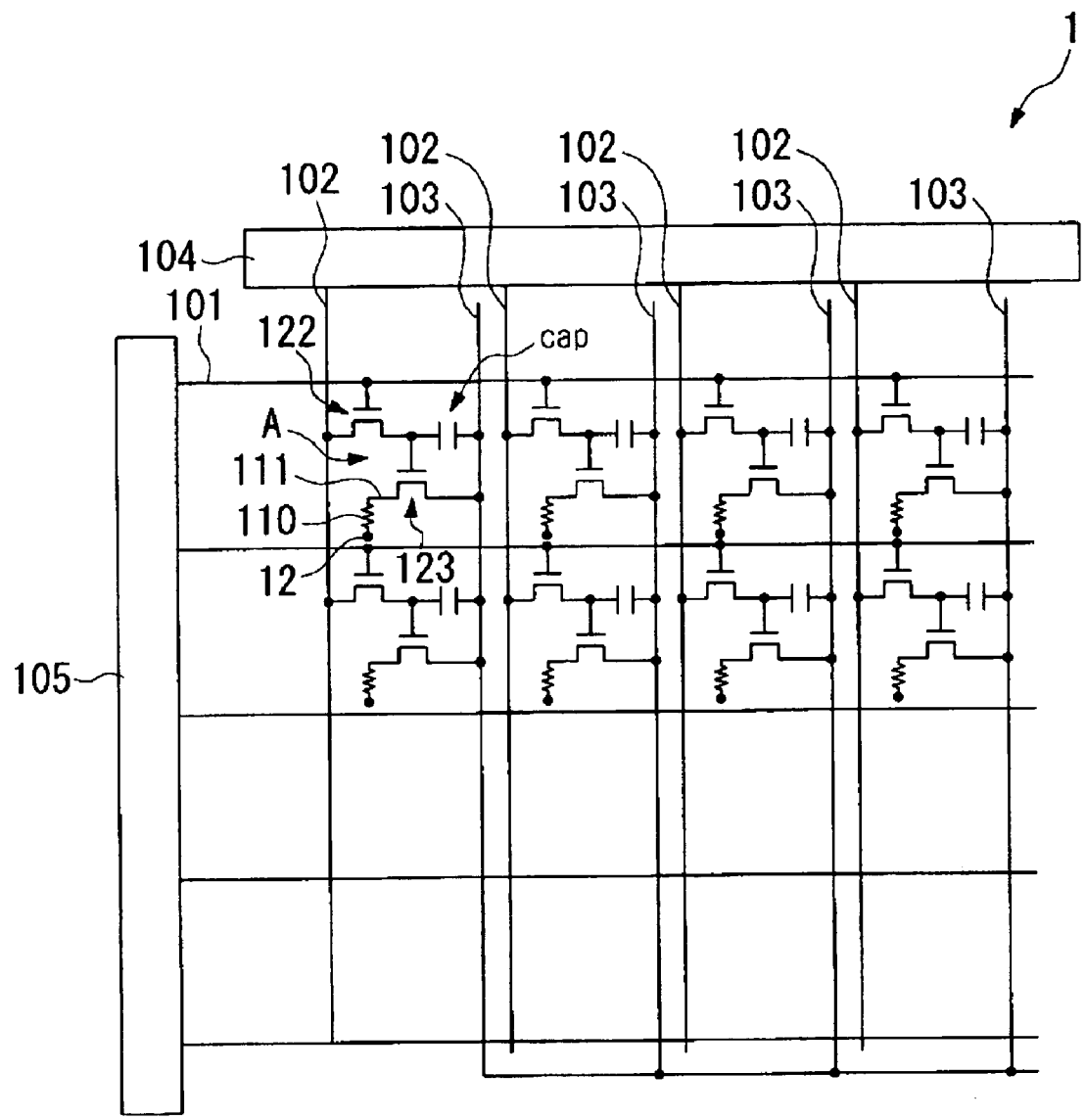
FIG. 5 is a plan schematic diagram illustrating an example of a wiring structure in the case where a device of the present invention is applied to a display.
Figure 6:
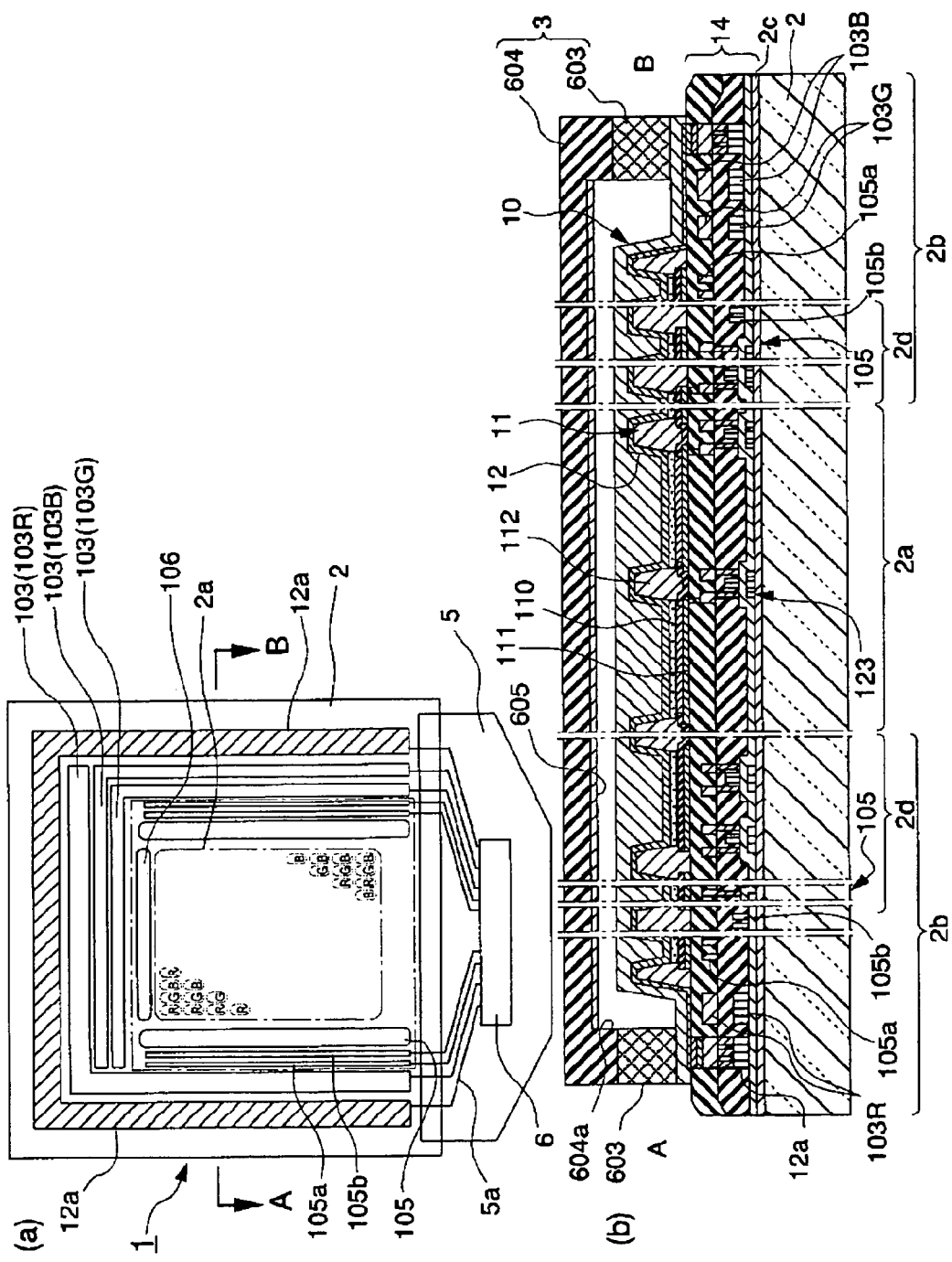
FIG. 6 are views illustrating an example in the case where a device of the present invention is applied to a display.

FIGS. 5 and 6 show an example where the device of the present invention is applied to an active matrix type display formed by an organic EL device. In these drawings, the sign "1" denotes a display.

FIG. 5 shows a plan diagram of a wiring structure of the display 1 of the example, and FIG. 6 show a plan diagram and a sectional diagram of the display 1 of the example.

As shown in FIG. 5, the display 1 of the example has a structure in which a plurality of scanning lines 101, a plurality of signal lines 102 extending in a direction of intersecting the scanning lines 101, and a plurality of power supply lines 103 extending parallel to the signal lines 102 are respectively wired, and pixel areas "A" are provided in the vicinities of respective intersections of the scanning lines 101 and the signal lines 102.

A data side driving circuit 104 including a shift register, a level shifter, a video line, and an analogue switch is connected to the signal lines 102. In addition, a scanning side driving circuit 105 including a shift register and a level shifter is connected to the scanning lines 101.

Further, in each pixel area "A," a first thin-film transistor 122 to which a scanning signal is supplied to its gate electrode via the scanning line 101, a holding capacity cap holding a pixel signal shared from the signal line 102 via the first thin-film transistor 122, a second thin-film transistor 123 to which a pixel signal held by the holding capacity cap is supplied to its gate electrode, a pixel electrode (electrode) 111 into which driving current flows from the power supply line 103 when electrically connected to the power supply line 103 via the second thin-film transistor 123, and a light emitting portion 110 sandwiched between the pixel electrode 111 and a cathode (counter electrode) 12 are provided. A light emitting element includes the pixel electrode 111, the counter electrode 12, and the light emitting portion 110.

According to the above structure, when the scanning line 101 is driven and the first thin-film transistor 122 is turned on, a potential of the signal line 102 at that time is held in the holding capacity cap, and the second thin-film transistor 123 is determined in on/off state according to the holding state of the holding capacity cap. Then, current flows from the power supply line 103 to the pixel electrode 111 via a channel of the second thin-film transistor 123, and the current flows to the cathode 12 via the light emitting portion 110. The light emitting portion 110 emits light according to the amount of current flowing therethrough.

Next, as shown in FIGS. 6(a) and 6(b), the display 1 of the example has a transparent base plate 2 made of glass etc., light emitting elements (organic EL elements) arranged in a matrix form, and a sealing base plate. The light emitting elements formed on the base plate 2 are formed by the pixel electrodes 111, the light emitting portions 110, and the cathode 12 as described above.

The base plate 2 is a transparent base plate of glass etc., for example, and partitioned into a display area 2a positioned at the center of the base plate 2 and a non-display area 2b located on a periphery of the base plate 2 and positioned on an outer side of the display area 2a.

The display area 2a is an area formed by light emitting elements arranged in a matrix form, and also referred to as an effective display area. In addition, the non-display area 2b is formed on the outer side of the display area. A dummy display area 2d neighboring the display area 2a is formed in the non-display area 2b.

Further, as shown in FIG. 6(b), a circuit element section 14 is provided between a light emitting element section 11, constituted by light emitting elements and bank portions, and the base plate 2, and in the circuit element section 14, the scanning line, the signal line, the holding capacity, the first thin-film transistor, the second thin-film transistor 123, etc. described above are provided.

Furthermore, the cathode 12 has an end connecting to a cathode wiring 12a formed on the base plate 2, and an end of this wiring is connected to a wiring 5a on a flexible substrate 5. The wiring 5a is connected to a driving IC 6 (driving circuit) provided on the flexible substrate 5.

In addition, as shown in FIGS. 6(a) and 6(b), the above-described power supply lines 103 (103R, 103G, 103B) are disposed in the non-display area 2b of the circuit element section 14.

Further, the above-described scanning side driving circuits 105, 105 are disposed on both sides of the display area 2a as shown in FIG. 6(a). The scanning side driving circuits 105, 105 are provided within the circuit element section 14 on the lower side of the dummy area 2d. Furthermore, a control signal wiring 105a for driving circuit and a power supply wiring 105b for driving circuit, which are connected to the scanning side driving circuits 105, 105, are provided within the circuit element section 14.

Additionally, an inspection circuit 106 is disposed in the display area 2a on the upper side in FIG. 6(a). Using this inspection circuit 106, inspection of quality and defects of display devices during manufacturing and before shipment can be performed.

Further, as shown in FIG. 6(b), a sealing section 3 is provided on the light emitting element section 11. This sealing section 3 is constituted by sealing resin 603 coated on the base plate 2 and a sealing base plate 604. The sealing resin 603 is made of thermosetting resin or ultraviolet cure resin, etc., and specifically, epoxy resin is suitable.

This sealing resin 603 is annularly coated on a periphery of the base plate 2 by a micro dispenser, for example. The sealing resin 603 is for bonding the base plate 2 and the sealing base plate 604 and serves to prevent water or oxygen from entering inside of the sealing base plate 604 from between base plate 2 and sealing base plate 604 to prevent the cathode 12 or a light emitting layer (not shown) formed within the light emitting element section 11 from being oxidized.

The sealing base plate 604 is made of glass or metal and bonded to the base plate 2 via the sealing resin 603, and a recess 604a for accommodating a display device 10 is provided on an inner side thereof. Further, a gettering agent 605 for absorbing water, oxygen, etc. is attached to the recess 604a to absorb water or oxygen entering inside of the can sealing base plate 604. By the way, the gettering agent 605 may be omitted.

Figure 7:
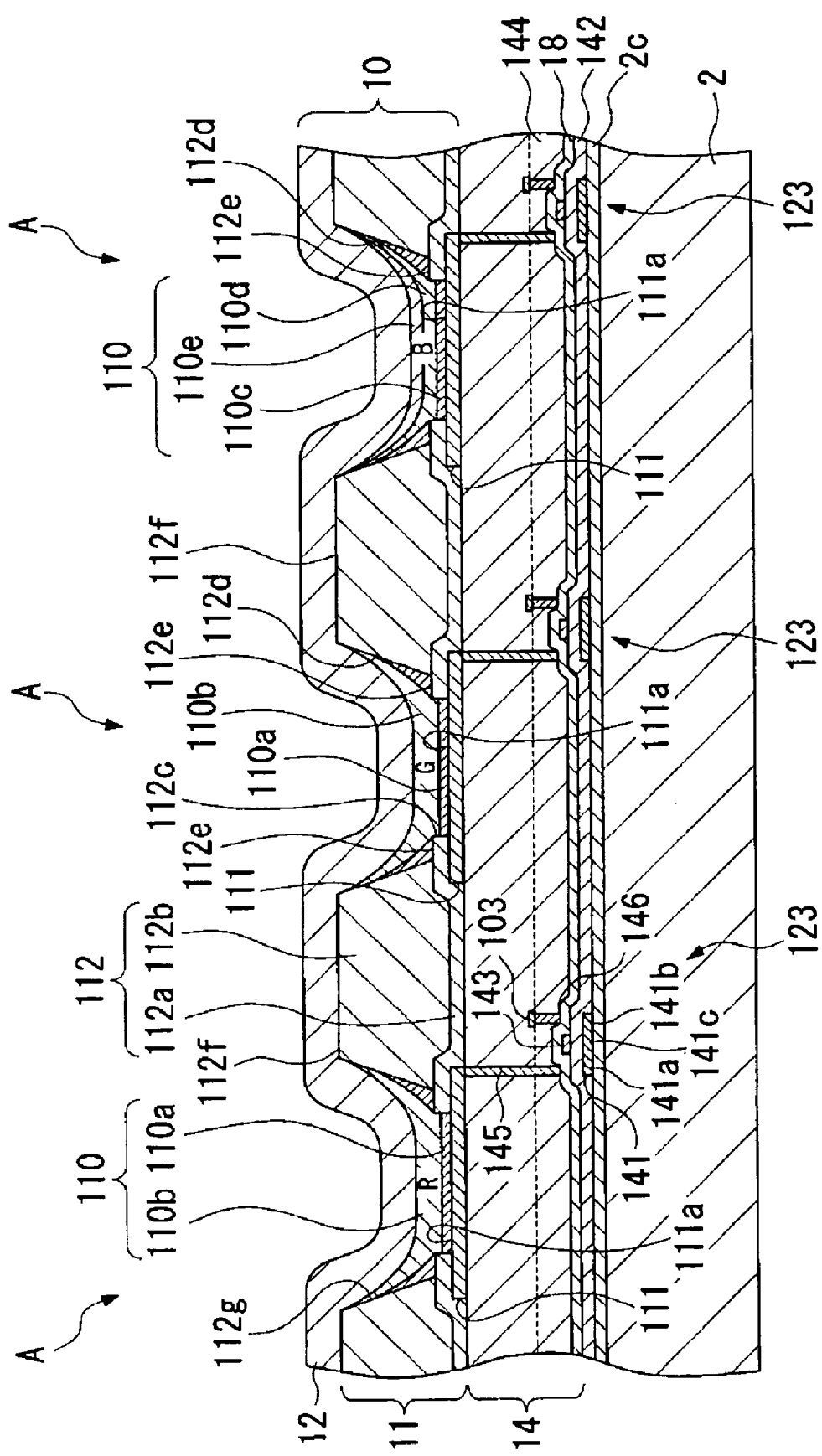
FIG. 7 is a side sectional view of a main part of the display shown in FIGS. 5 and 6.

Next, FIG. 7 shows a view in which a sectional structure of the display area in the display 1 is enlarged. Three pixel areas "A" are shown in FIG. 7. The display 1 is constituted by sequentially laminating the circuit element section 14, in which a circuit such as a TFT is formed, and the light emitting element section 11, in which the light emitting portions 110 are formed, on the base plate 2.

This display 1 is adapted so that the light emitted from the light emitting portion 110 to the base plate 2 side may be transmitted through the circuit element section 14 and base plate 2 and output to the lower side (observer side) of the base plate 2, while the light emitted from the light emitting portion 110 to the opposite side of the base plate 2 may be reflected by the cathode 12, transmitted through the circuit element section 14 and the base plate 2, and output to the lower side (observer side) of the base plate 2.

By the way, it is possible to output the light from the cathode 12 side by using a transparent material as the cathode 12.

In the circuit element section 14, a base overcoating film 2c made of silicon oxidized film is formed on the base plate 2, and island-shaped semi-conductive films 141 made of polycrystalline silicon are formed on the base overcoating film 2c. Note that a source region 141a and a drain region 141b are formed on the semi-conductive film 141 by high concentration P ion implantation. A portion in which P is not introduced serves as a channel region 141c.

Further, in the circuit element section 14, a transparent gate insulative film 142 covering the base overcoating film 2c and the semi-conductive films 141 is formed, gate electrodes 143 (scanning lines 101) made of Al, Mo, Ta, Ti, W, etc. are formed on the gate insulative film 142, and a transparent interlayer insulative film 144 is formed to also serve as a planarizing film on the gate electrodes 143 and the gate insulative film 142 via a lyophilic film 18.

Here, the interlayer insulative film 144 is planarized while being hardly affected by irregularities of the base components such as the gate electrodes 143 because the lyophilic film 18 is formed below it in advance, therefore, the film performs uniform insulation characteristics over the entire layer to perform preferable insulation characteristics, and also serves as a planarizing film. Thus, the entire lamellation is enabled as compared with the case where both of the interlayer insulative film 144 and the planarizing film are formed. Note that the interlayer insulative film 144 may be constituted by laminating two layers and the power supply lines 103 may be disposed between the two layers, as shown in FIG. 7. Further, as forming material of the above interlayer insulative film, TEOS (Tetraethoxysilane) or various low dielectric materials such as porous silica, polyimide, and fluorocarbon are used. Furthermore, as a forming method of the lyophilic film 18, the method using the above-described device is adopted without change.

Additionally, contact holes 145, 146 passing through the interlayer insulative film 144 and respectively connected to the source and drain regions 141a, 141b of the semiconductive film are formed.

Further, on the interlayer insulative film 144, transparent pixel electrodes 111 made of ITO etc. are formed by patterning in a predetermined form, and contact holes 145 are connected to the pixel electrodes 111.

Furthermore, the contact holes 146 are connected to the power supply lines 103.

Thus, the second thin-film transistors 123 connected to the respective pixel electrodes 111 are formed in the circuit element section 14.

Note that the above-described holding capacity cap and the first thin-film transistor 122 are also formed in the circuit element section 14, however, the illustration thereof is omitted in FIG. 7.

The light emitting element section 11 is mainly constituted by the light emitting portions 110 laminated on the respective plural pixel electrodes 111, bank portions 112 provided between the respective pixel electrodes 111 and the light emitting portions 110 and partitioning the respective light emitting portions 110, and the cathode 12 formed on the light emitting portions 110.

Here, the pixel electrodes 111 are made of ITO, for example, and formed by patterning in a substantially rectangular shape seen in a plan view. A thickness of the pixel electrode 111 is preferably in a range from 50 to 200 nm, and particularly, about 150 nm is more preferable. The bank portions 112 are provided between the respective pixel electrodes 11.

The bank portion 112 is made by laminating an inorganic matter bank layer 112a (a first bank layer) located on the base plate 2 side and an organic bank matter layer 112b (a second bank layer) located apart from the base plate 2.

The inorganic and organic bank layers (112a, 112b) are formed so as to be on the peripheries of the pixel electrodes 111. In a plan view, the peripheries of the pixel electrodes 111 and the inorganic matter bank layers 112a are positioned so as to be superposed in a plane. Further, the organic matter bank layers 112b are similarly positioned so as to be superposed on parts of the pixel electrodes 111 in a plane. Furthermore, the inorganic matter bank layer 112a is additionally formed toward the center side of the pixel electrode 111 relative to the organic matter bank layer 112b. Thus, since respective first lamination portions 112e of the inorganic matter bank layers 112a are formed on the inner side of the pixel electrodes 111, lower openings 112c are formed, corresponding to the positions in which the pixel electrodes 111 are formed.

Further, upper openings 112d are formed in the organic matter bank layers 112b. The upper openings 112d are provided so as to correspond to the positions in which the pixel electrodes 111 are formed and to the lower openings 112c. The upper opening 112d is formed so as to be larger than the lower opening 112c, as shown in FIG. 7, and smaller than the pixel electrode 111. Furthermore, sometimes the location of the upper portion of the upper opening 112d and the end of the pixel electrode 111 are formed so as to be nearly in the same position. In that case, the section of the upper opening 112d of the organic matter bank layer 112b is in an inclined form, as shown in FIG. 7.

And, in the bank portion 112, an opening 112g passing through the inorganic matter bank layer 112a and organic matter bank layer 112b is formed by communicating the lower opening 112c and the upper opening 112d.

Further, the inorganic matter bank layer 112c is preferably made of inorganic material such as SiO2 and TiO2. A thickness of the inorganic matter bank layer 112a is preferably set in a range from 50 to 200 nm, and specifically, desirably set to 150 nm. One reason is that, in the case where the thickness is less than 50 nm, since the inorganic matter bank layer 112a is thinner than a hole injection layer, which is described later, there is a possibility that the planarization of the hole injection layer can not be assured. The other reason is that, in the case where the thickness is more than 200 nm, since a step due to the lower opening 112c becoming large, there is a possibility that the planarization of a light emitting layer, which is described later, laminated on the hole injection layer can not be assured.

The organic matter bank layer 112b is formed by a heat stable and solvent stable material such as acrylic resin and polyimide resin. A thickness of the organic matter bank layer 112b is preferably in a range from 0.1 to 3.5 μm, and particularly, about 2 μm is more preferable. One reason is that, in the case where the thickness is less than 0.1 μm, since the organic matter bank layer 112b becomes thinner than the total thickness of the hole injection layer and the light emitting layer, which are described later, there is a possibility that the light emitting layer may overflow from the upper opening 112d. The other reason is that, in the case where the thickness is over 3.5 μm, since a step due to the upper opening 112d becoming large, there is a possibility that a step coverage of the cathode 12 formed on the organic matter bank layer 112b can not be assured. Further, if the thickness of the organic matter bank layer 112b is set to 2 μm or more, it is more preferable because the insulation to the second thin-film transistor 123 can be improved.

Additionally, areas showing a lyophilic property and areas showing liquid repellency are formed in the bank portion 112.

The areas showing a lyophilic property are the first lamination portion 112e of the inorganic matter bank layer 112a and an electrode surface 111a of the pixel electrode 111, these areas are surface treated so as to have a lyophilic property by plasma treatment with oxygen as treatment gas. In addition, the areas showing liquid repellency are a wall surface of the upper opening 112d and an upper surface 112f of the organic matter bank layer 112, and these areas have surfaces fluorinated (liquid-repellent treated) by plasma treatment with tetrafluoromethane etc. as treatment gas. By the way, the organic matter bank layer may be formed by material including fluoropolymer.

In the light emitting portion 110, in this example, a red pixel R and a green pixel G are constituted by a hole injection layer laminated on the pixel electrode 111 and a light emitting layer formed on the hole injection layer. A blue pixel B is constituted by a hole injection layer laminated on the pixel electrode 111, a hole transport layer formed on the hole injection layer, a light emitting layer formed on the hole transport layer, and an electron transport layer formed on the light emitting layer. That is, in the example, the light emitting layers in the red pixel R and the green pixel G are formed by high molecular material as described later, and the light emitting layer in the blue pixel B is formed by low molecular material. By the way, in the pixel R and the green pixel G, an electron injection transport layer etc. may also be formed adjacently to the light emitting layer.

The hole injection layer and the hole transport layer have a function of injecting a hole into the light emitting layer, and a function of transporting the hole inside thereof. By providing such hole injection layer and hole transport layer between the pixel electrode 111 and the light emitting layer, element characteristics such as the light emitting efficiency of the light emitting layer and duration of life can be improved. Further, the light emitting layer is adapted so that the hole injected from the hole injection layer and the hole transport layer and the electron injected from the cathode 12 may be recombined to emit light.

The light emitting layer is formed on the hole injection layer and the hole transport layer. Such light emitting layer is constituted by three kinds of layers of a red light emitting layer that emits light in red (R), a green light emitting layer that emits light in green (G), and a blue light emitting layer that emits light in blue (B), and the light emitting layers of respective colors are arranged in a striped manner for example.

Here, since the electrode surface 111*a* of the pixel electrode 111 and the first lamination portion 112*e* of the inorganic matter bank layer have a lyophilic property, the light emitting portion 110 uniformly adheres to the pixel electrode 111 and the inorganic matter bank layer 112*a*, and the light emitting portion 110 does not become extremely thin on the inorganic matter bank layer 112*a*, therefore, the short circuit of the pixel electrode 111 and the cathode 12 is prevented.

Further, since the upper surface 112*f* of the organic matter bank layer 112*b* and the wall surface of the upper opening 112*d* have liquid repellency, the adhesion of the light emitting portion 110 and the organic matter bank layer 112*b* becomes low, and the light emitting portion 110 is formed while preventing its overflowing from the opening 112*g*.

The cathode 12 is formed on the entire surface of the light emitting element section 11 in the example, and forms a pair with the pixel electrode 111 to allow current to flow in the light emitting portion 110. This cathode 12 is formed by LiF/Al (laminated film of LiF and Al), MgAg, or LiF/Ca/Al (laminated film of LiF, Ca, and Al) in the example.

Note that, on such cathode 12, an antioxidant overcoating layer made of SiO, SiO2, SiN, etc. may be provided.

Then, the display 1 is constituted by disposing the sealing base plate 604 on the light emitting elements formed as described above, and bonding the sealing base plate 604 by the sealing resin 603, as shown in FIG. 6(*b*).

In the above display 1, since the interlayer insulative film 144 is formed via the lyophilic film 18, the interlayer insulative film 144 performs uniform insulation characteristics over the entire layer to perform preferable insulation characteristics, and becomes to also serve as a planarizing film. Therefore, the display has preferable display characteristics, thereby effects such as an improvement of percentage of non-defective product can be improved.

Note that, in the example, the functional film of the present invention is described in the case where the film is applied to an interlayer insulative film also serving as a planarizing film, however, as a matter of course, the lyophilic film may be formed as a base film of the functional film as the interlayer insulative film or the planarizing film.

Electronic Instruments

Examples of electronic instruments comprising the device of the above-described embodiment will be described.

Figure 8:
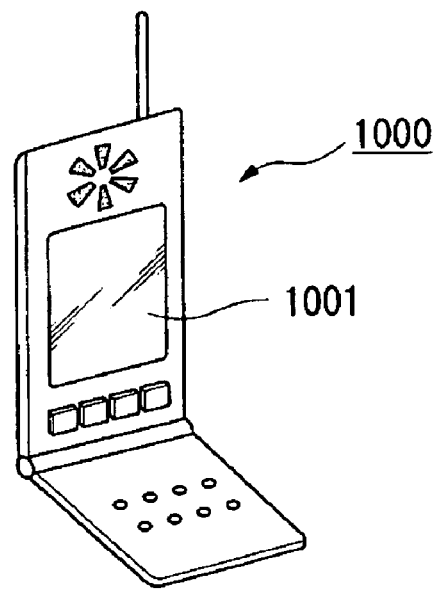
FIG. 8 is a view illustrating an example of an electronic instrument with an optical element of the embodiment.

FIG. 8 is a perspective view illustrating an example of a cellular phone. In FIG. 8, the sign "1000" denotes a cellular phone main body, and the sign "1001" denotes a display constituted by the device.

Figure 9:
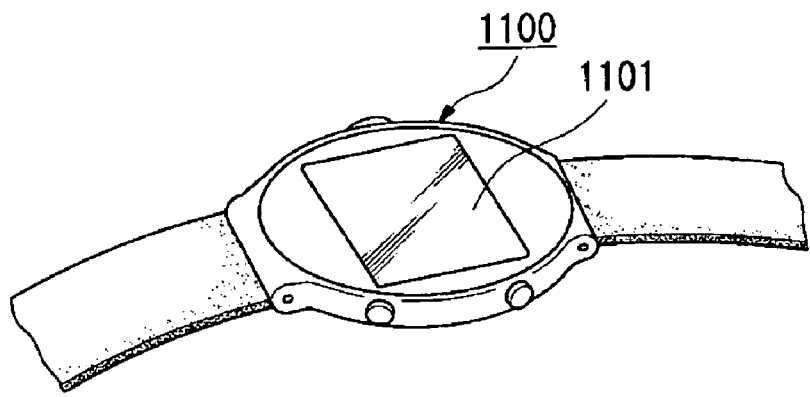
FIG. 9 is a view illustrating an example of an electronic instrument with an optical element of the embodiment.

FIG. 9 is a perspective view illustrating an example of a wrist watch type electronic instrument. In FIG. 9, the sign "1100" denotes a watch main body, and the sign "1101" denotes a display constituted by the device.

Figure 10:
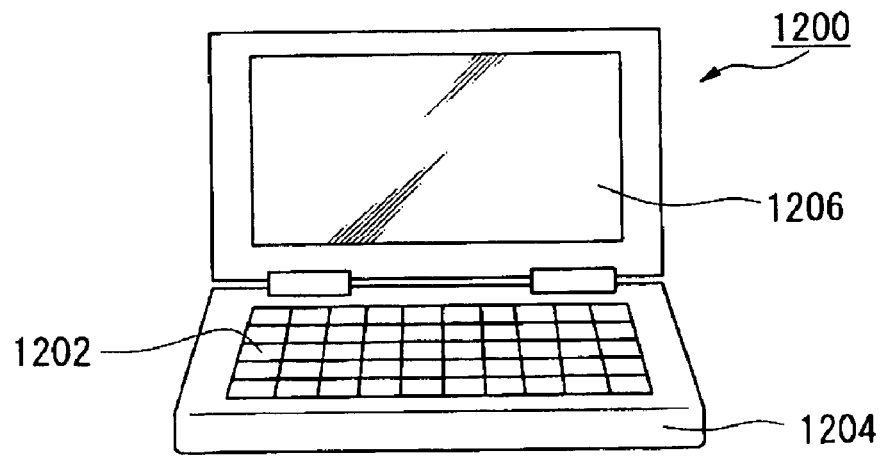
FIG. 10 is a view illustrating an example of an electronic instrument with an optical element of the embodiment.
Figure 11:
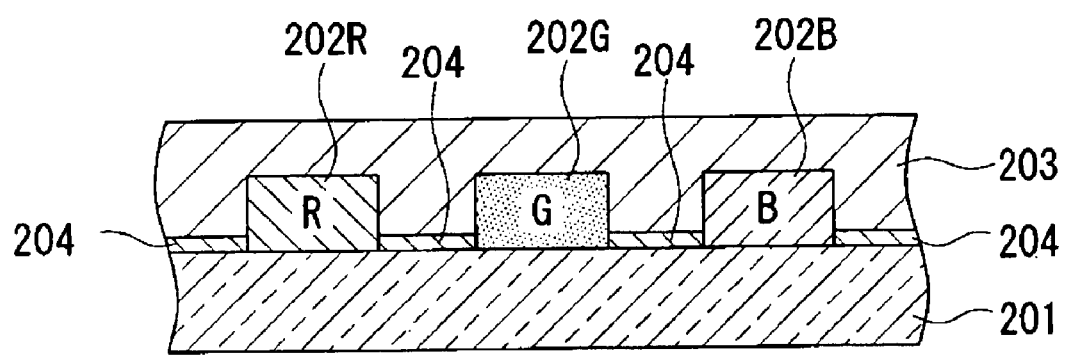
FIG. 11 is a side sectional view of a main part illustrating an example of a conventional color filter substrate.
Figure 12:
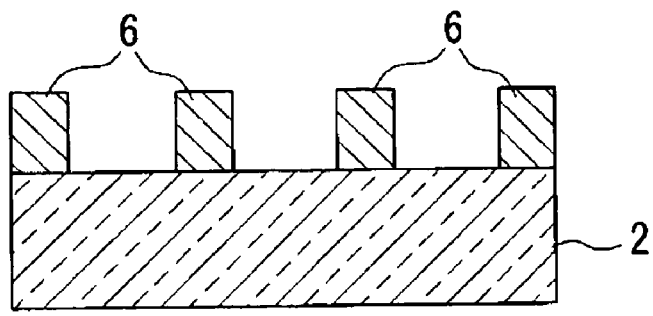
FIGS. 12(a) to (d) are side sectional views of a main part for explaining an example of a manufacturing method of the color filter substrate in sequential steps.
Figure 12:
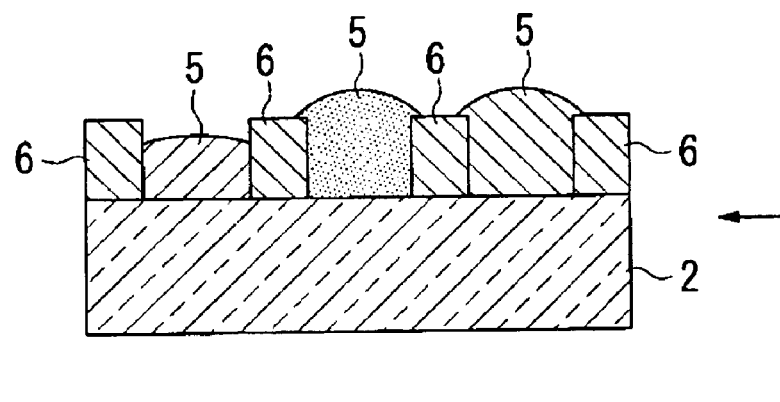
Figure 12:
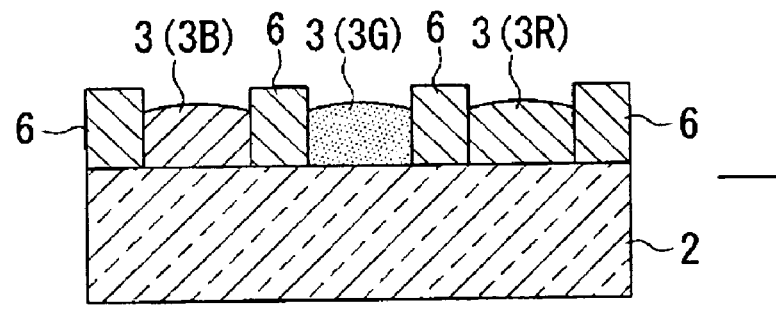
Figure 12:
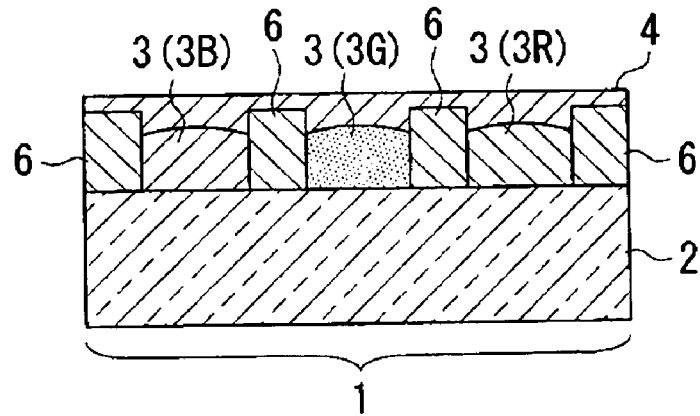

FIG. 10 is a perspective view illustrating an example of a portable information processing device such as a word processor and a personal computer. In FIG. 10, the sign "1200" denotes information processing device, the sign "1202" denotes an input section such as a keyboard, the sign "1204" denotes information processing device main body, and the sign "1206" denotes a display constituted by the device.

The electronic instruments shown in FIGS. 8 to 10 comprise the device of the above embodiment, and thus have preferable display characteristics, and the productivity will be improved because of the improvement in the percentage of non-defective product, etc. Further, as other examples of electronic instruments, various electronic instruments such as a liquid crystal device, an electronic organizer, a pager, a POS terminal, an IC card, a mini-disc player, a liquid crystal projector, an engineering work station (EWS), a word processor, a television, a video tape recorder of viewfinder type or monitor direct view type, a electronic desktop calculator, a car navigation system, a device with a touch panel, a clock, a game machine, and an electrophoretic device can be cited.

As described above, according to the present invention, since a lyophilic film is formed on a base component and a functional film is provided on the lyophilic film, the functional film can be planarized and the thickness thereof can be made uniform by uniformly spreading the film. Therefore, since the functional film is formed to be planarized and uniformly thick, the functional characteristics of the functional film can be preferable. Thus, beneficial effects such as the improvement of percentage of non-defective products and the shortening of the time for forming the film can be realized.

The entire disclosure of Japanese Patent Application No. 2002-311051 filed Oct. 25, 2002 is incorporated by reference.

What is claimed is:

1. A device comprising:
   a base plate;
   a display plate disposed opposite the base plate with a liquid crystal therebetween;
   a transflective layer formed on a liquid crystal side of the base plate;
   a plurality of electrodes formed on the transflective layer;
   a first lyophilic film formed of a lyophilic material provided on the electrodes;
   a first functional film formed of a liquid material including a resin provided on the first lyophilic film, the first lyophilic film planarizing the first function film;
   a color filter formed on a liquid crystal side of the display plate;
   a second lyophilic film formed of the lyophilic material provided on the color filter;
   a second functional film formed of the liquid material including the resin provided on the second lyophilic film, the second lyophilic film planarizing the second functional film;
   another plurality of electrodes formed on the second functional film;
   a third lyophilic film formed of the lyophilic material provided on the another plurality of electrodes; and
   a third functional film formed of the liquid material including the resin provided on the third lyophilic film, the third lyophilic film planarizing the third functional film;
   wherein each of the lyophilic films have a lyophilic property relative to the liquid material including the resin used for forming each of the functional films;

wherein the lyophilic material is a hydrocarbon polymerized film.

2. The device according to claim 1, wherein each of the lyophilic films are plasma treated under at least one of atmospheric pressure and a reduced pressure.

3. The device according to claim 1, wherein each of the lyophilic films are electromagnetic wave irradiated under at least one of atmospheric pressure and a reduced pressure.

4. The device according to claim 3, wherein said electromagnetic wave further comprises an ultraviolet ray.

5. An electronic instrument comprising the device according to claim 1.

6. A manufacturing method of a device comprising:
providing a base plate;
providing a display plate opposite to the base plate;
forming a transflective layer on the base plate;
forming a plurality of electrodes on the transflective layer;
depositing a first lyophilic film on the electrodes;
providing a first functional film formed of a liquid material including a resin on the first lyophilic film, the first lyophilic film planarizing the first function film;
forming a color filter on the display plate;
forming a second lyophilic film on the color filter;
forming a second functional film formed of the liquid material including the resin on the second lyophilic film, the second lyophilic film planarizing the second function film;
forming another plurality of electrodes on the second functional film;
forming a third lyophilic film on the another plurality of electrodes;
forming a third functional film formed of a liquid material including the resin on the third lyophilic film, the third lyophilic film planarizing the third function film; and
disposing a liquid crystal between the base plate and the display plate;
wherein each of the lyophilic films have a lyophilic property relative to a liquid forming material used for forming the functional films;
wherein each of the lyophilic films are formed of a hydrocarbon polymerized film.

7. The manufacturing method of a device according to claim 6, wherein said steps of forming said lyophilic films further comprise performing plasma treatment under at least one of atmospheric pressure and a reduced pressure.

8. The manufacturing method a device according to claim 6, wherein said steps of forming said lyophilic films further comprise irradiating with an electromagnetic wave under at least one of atmospheric pressure and a reduced pressure.

9. The manufacturing method of a device according to claim 8, wherein said electromagnetic wave further comprises an ultraviolet ray.

10. An electronic instrument comprising the device manufactured by the method according to claim 6.

* * * * *